(12) United States Patent
Conner

(10) Patent No.: US 8,061,759 B2
(45) Date of Patent: Nov. 22, 2011

(54) ACTUATION MECHANISM FOR A TARPING SYSTEM

(75) Inventor: Nicholas Conner, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 303 days.

(21) Appl. No.: 12/540,768

(22) Filed: Aug. 13, 2009

(65) Prior Publication Data

US 2010/0038925 A1 Feb. 18, 2010

Related U.S. Application Data

(60) Provisional application No. 61/088,368, filed on Aug. 13, 2008.

(51) Int. Cl.
*B60J 11/00* (2006.01)
*F16F 1/10* (2006.01)

(52) U.S. Cl. ............... 296/100.14; 185/45; 267/156; 267/169

(58) Field of Classification Search .............. 185/37, 185/39, 40 R, 45; 248/500, 503, 505; 267/154, 267/155, 156, 169, 272, 273; 296/98, 100.14
See application file for complete search history.

(56) References Cited

U.S. PATENT DOCUMENTS

| 1,478,173 | A | * | 12/1923 | Clark | 185/45 |
|---|---|---|---|---|---|
| 1,962,056 | A | * | 6/1934 | Colomb | 368/209 |
| 3,381,915 | A | * | 5/1968 | Nelson | 242/373 |
| 3,533,588 | A | * | 10/1970 | Cregier | 248/309.1 |
| 3,549,197 | A | * | 12/1970 | Sibley | 296/98 |
| 3,628,826 | A | * | 12/1971 | Sibley | 296/98 |
| 3,854,770 | A | * | 12/1974 | Grise et al. | 296/98 |
| 3,868,142 | A | * | 2/1975 | Bachand et al. | 296/98 |
| 3,886,374 | A | | 5/1975 | Lefeuvre | |
| 4,030,780 | A | * | 6/1977 | Petretti | 296/98 |
| 4,050,734 | A | * | 9/1977 | Richard | 296/98 |
| 4,082,347 | A | * | 4/1978 | Petretti | 296/98 |
| 4,365,690 | A | * | 12/1982 | Zavatkay et al. | 185/45 |
| 4,635,755 | A | | 1/1987 | Arechaga | |
| 4,732,121 | A | * | 3/1988 | Miyata et al. | 123/185.3 |
| 4,850,233 | A | * | 7/1989 | Ishigo | 74/6 |
| 5,294,097 | A | | 3/1994 | Thomsen et al. | |
| 5,655,807 | A | | 8/1997 | Rosario | |
| 5,681,117 | A | * | 10/1997 | Wellman et al. | 384/441 |
| 5,799,760 | A | * | 9/1998 | Small | 188/371 |
| 5,887,937 | A | * | 3/1999 | Searfoss | 296/122 |
| 6,273,490 | B1 | * | 8/2001 | Haddad, Jr. | 296/100.01 |
| 6,318,790 | B1 | | 11/2001 | Henning | |
| 6,457,622 | B2 | * | 10/2002 | Henning | 296/98 |
| 6,575,519 | B2 | * | 6/2003 | Henning | 296/98 |
| 6,942,274 | B2 | * | 9/2005 | Henning | 296/98 |
| 6,979,043 | B2 | | 12/2005 | Leischner et al. | |
| 2004/0026840 | A1 | * | 2/2004 | Eckel et al. | 267/154 |
| 2007/0102951 | A1 | * | 5/2007 | Chenowth | 296/98 |

* cited by examiner

*Primary Examiner* — Glenn Dayoan
*Assistant Examiner* — Paul Chenevert
(74) *Attorney, Agent, or Firm* — Maginot, Moore & Beck, LLP

(57) ABSTRACT

An actuation mechanism for a tarping system includes a double coil spring mountable on a pivot shaft of the mechanism. A bushing is mounted on the pivot shaft and within the double coil spring. The bushing includes an eccentric external periphery that limits the deflection of the spring, particularly at the transition points between the center portion and each of the coil portions of the spring. As the spring winds or coils, the coil portions progressively contact the eccentric periphery of the bushing to not only limit further movement of the coil portions, but also to provide support for those portions under load.

12 Claims, 7 Drawing Sheets

ACTUATION MECHANISM FOR A TARPING SYSTEM

REFERENCE TO RELATED APPLICATION

The present application claims priority to co-pending provisional application No. 61/088,368, filed on Aug. 13, 2008.

BACKGROUND

The present invention relates to covers or tarping systems for open-topped containers, and more specifically to an actuation mechanism for pivoting the cover over a truck bed.

Some hauling vehicles, such as dump trucks, include open-topped containers used for hauling or storing various materials. For example, in a typical dump truck application, the dump body is used to haul a variety of particulate material, such as gravel, aggregate or similar products. In addition, some hauling vehicles carry organic materials, such as grain or produce.

Depending upon the nature of the materials stored in the open-topped container, it is often desirable to provide a cover for the container. Of course, rigid covers are well known that may be hinged from one end of the container body. These rigid covers have gradually given way in the industry to flexible tarping systems because the flexible tarpaulin can be easily stowed when a cover is not necessary, such as when the dump bed is being loaded. Moreover, the flexible tarp is much easier to deploy than a rigid cover.

One tarping system for use with dump trucks is the EASY COVER® Tarping System, of Aero Industries, Inc. The EASY COVER® Tarping System includes a U-shaped bail member that is pivotally mounted at its ends to the base of the container body. The horizontal section of the U-shaped bail is attached to the tarp, while the free ends of the vertical elements are pivotally mounted.

As shown in FIG. 1, a vehicle 10 having an open-topped dump body 11, such as a dump truck, includes a tarpaulin cover 12, which is shown in its deployed configuration spanning the length of the container. The tarp cover 12 is wound onto a tarp roller 14 at the forward end of the bed.

A U-shaped bail member 16 is connected to one end of the tarp cover 12 and is pivotally mounted to the truck body 11 by way of an actuation mechanism 20. This actuation mechanism can take a variety of forms including extension springs, compression spring, and coil torsion springs which apply a torque or moment to arms 17 of the U-shaped bail member 16. When the actuation mechanism is released, it automatically pivots the bar, thereby unfurling the tarp from the tarp roller 14. A hand crank or powered motor can be provided to rotate the tarp roller in the opposite direction to wind the tarp onto the roller when it is desired to open the container top. The hand crank or motor mechanism must be capable of providing sufficient mechanical advantage to overcome the deployment force of the actuation mechanism.

One such actuation mechanism implemented in the Easy Cover® Tarping System incorporates a "double-coil" spring as more fully described in U.S. Pat. No. 6,318,790 to Henning, the disclosure of which is incorporated herein by reference. As shown in FIG. 2, this actuation mechanism 20 includes an elastically deformable double-coil spring 21 with two coil portions 23 and 24 concentrically wound around each other and disposed in a common plane with an integral center anchor section 28 between each of the coil portions 23 and 24. Each of the coil portions include a free reaction end connected to arm 17 of the bail member 16 through a pair of reaction posts 26 and 27 mounted on the arm. The center anchor section 28 is held fixed relative to the pivoting bail arm 17 and is generally fixed to the dump body 11 by a pivot shaft 18 mounted thereto. The double-coil spring 21 is arranged to apply a torsional force to the bail arm 17 to deploy the tarp cover 16, as described above.

As shown in FIG. 3, the mechanism 20 includes a housing 32 that sandwiches the double coil spring 21 between opposed housing halves. After the spring is fitted into the housing halves, the reaction posts 26 and 27 extend through openings in the housing halves. The pivot shaft 18 passes through an opening in the housing 32 to engage the center anchor section 28 of the spring. It is understood that the housing pivots about the pivot shaft to pivot the bail member arm 17 secured to the housing 32.

It has been found in practice that the double coil springs of the actuation mechanism endure their greatest stress at the transition portions 35 (see FIG. 2) between the center anchor section 28 and the coil portions 23 and 24. Repeated deployment of heavy tarps by the actuation mechanism means repeated coiling and uncoiling of the spring, which may lead to eventual fatigue of the coil springs. Since metal fatigue typically occurs at a location of greatest stress, for the double coil springs the transition portion 35 is a potential site for failure.

The weight of the tarp and its deployment mechanism may be minimized to lower the stress on the springs of the actuation mechanism and to lengthen the fatigue life of the springs. Also the fatigue life of the springs can be lengthened by increasing the number of springs and the size of the springs. However, weight reduction of the tarp and its mechanism is constrained by the need to maintain a durable tarp and mechanism. Similarly, increasing the number and size of the springs is limited by cost, space and weight considerations.

Consequently, there remains a need for improvements to a double coil torsion spring actuation mechanism, and particularly to eliminate stress or fatigue points in the spring.

SUMMARY

According to an embodiment of the present disclosure an improvement to coil spring actuation mechanism for a cover system on an open-topped container is provided. The cover system includes a cover extendable from a stowed position to a deployed position covering the container and a bail member attached to the cover and movable relative to the container to move the cover between the stowed and deployed positions. The mechanism includes a pivot shaft mountable on the container and a double coil spring mountable on the pivot shaft. The improvement comprises a bushing mountable on the pivot shaft and within the double coil spring.

In accordance with certain features, the bushing has an eccentric external periphery that is progressively increasingly spaced from the coil portion of the spring as the coil portion diverges from the mounting portion of the spring. The eccentric external periphery limits the deflection of the spring at the transition points between the center portion and each of the coil portions. In particular, at some point in the coiling of the spring, the coil portions contact the eccentric periphery of the bushing to not only limit further movement of the coil portions, but also to provide support for those portions under load.

One important benefit of the present invention is that it significantly reduces the stress concentration in the bend points of the double coil spring. Another benefit is that the bushing provides an inexpensive solution that will significantly prolong the life of the spring in the actuation mechanism.

BRIEF DESCRIPTION OF THE DRAWINGS

The accompanying drawings illustrate embodiments of the present disclosure and together with a description serve to explain the principles of the disclosure.

DETAILED DESCRIPTION

Figure 1:
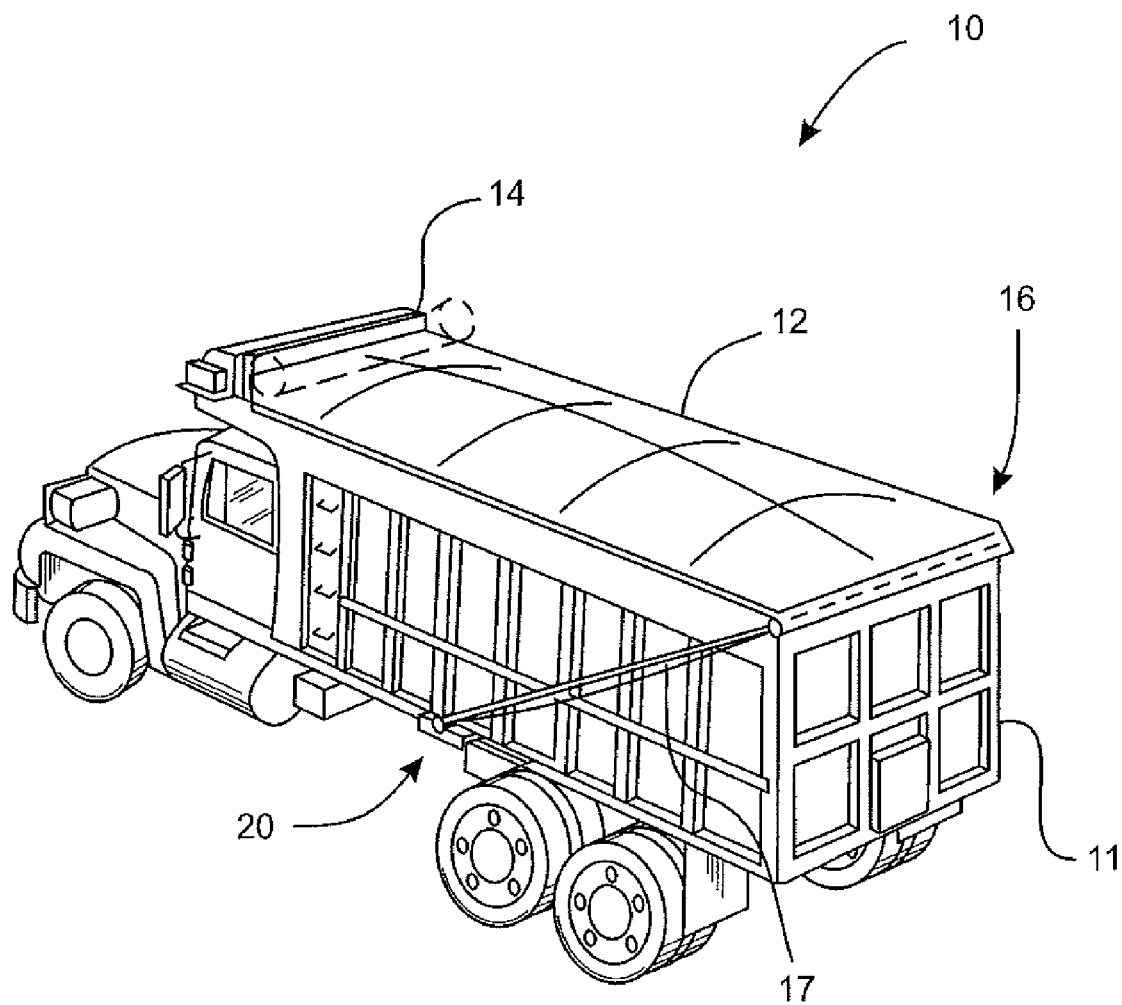
FIG. 1 is a perspective view of a vehicle utilizing a tarping system to cover the open-topped body of the vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

According to the present disclosure, the actuation mechanism 20 incorporates a bushing 100 shown in FIGS. 4-7 that helps reduce stress and fatigue in the transition portions 35 of an elastically deformable double-coil spring 21. The mechanism 20 itself is otherwise similar to the mechanism shown in FIGS. 2 and 3. It should be appreciated that the mechanism 20 may be retrofitted with the bushing 100 without modification to the housing 32 or any other components of the mechanism.

Figure 4:
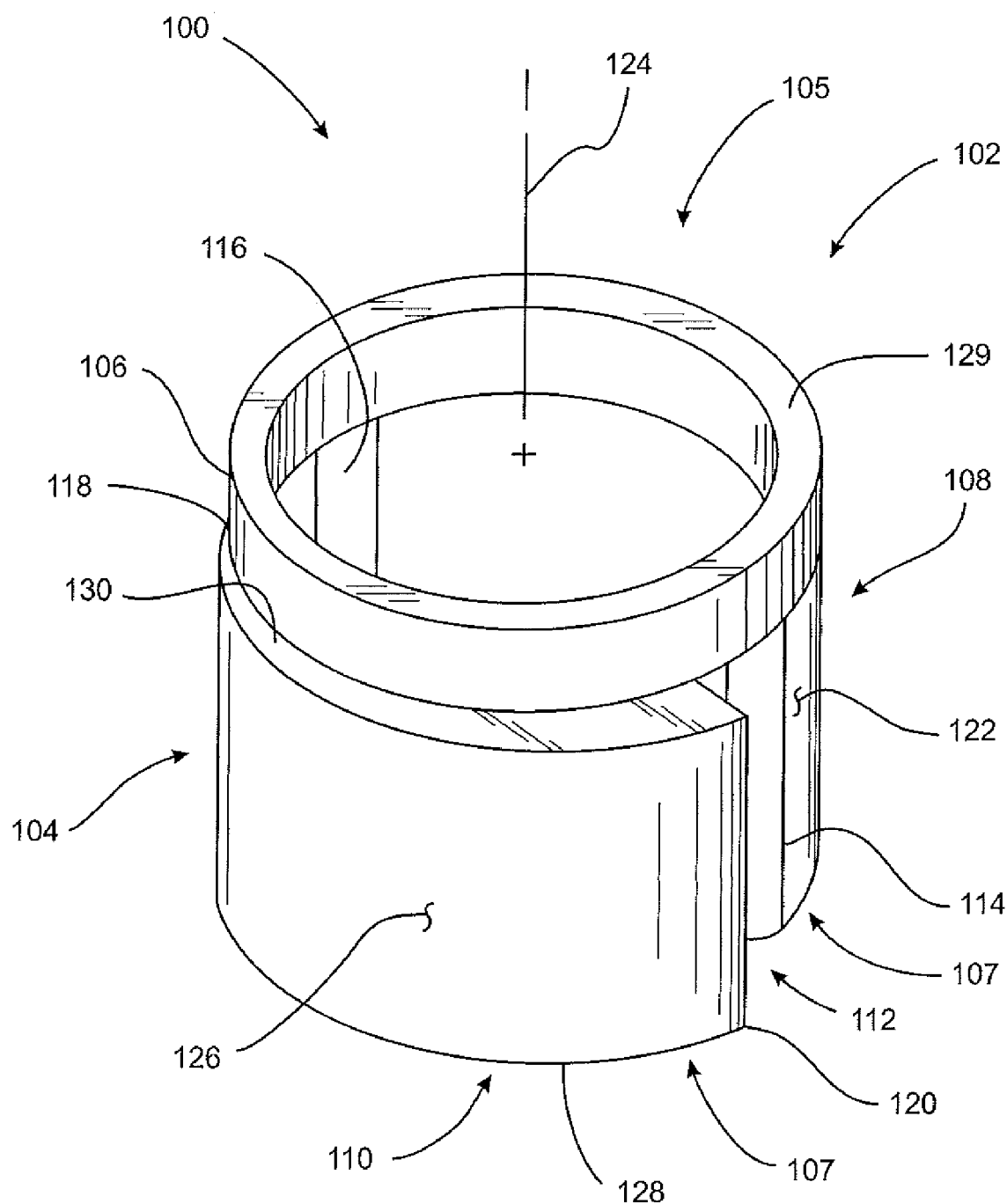
FIG. 4 is a perspective view of a bushing for use with the double coil torsion spring shown in FIG. 2.

The bushing 100, as shown in FIG. 4, includes a body 102 that is generally in the form of a hollow cylinder with a central opening 105. The body 102 includes a cam portion 104 and a collar 106. The cam portion 104 defines an eccentric external periphery 107 which itself includes a first cam surface 108 and a second cam surface 110 that are diametrically opposite each other on the periphery. The first cam surface 108 is separated from the second cam surface 110 by a slot 112 that extends across the diameter of the body 102. The first cam surface 108 extends from a small end 114 to a large end 116, with the small end defined at a radius that is less than the radius at which the large end is defined. Similarly, the second cam surface 110 extends from a small end 118 to a large end 120 preferably having the same dimensions and dimensional relationship as the ends of the first cam surface.

To conform to the contour of the coil spring 21, the first cam surface 118 includes a first coil contact surface 122 which increases in radius, as measured from the axis 124 through the central opening 105 of the bushing 100, in the direction from small end 114 to large end 116 of the first cam surface 108. Similarly, the second cam surface 110 includes a second coil contact surface 126 which continually increases in radius from the small end 118 to the large end 120 of the second cam surface 110. The height of the two coil contact surfaces 122, 126 is sufficient to fully bear against the full diameter of the coil spring when the bushing 100 is placed within the actuation mechanism 20, as described herein. The height of the bushing may also be adjusted to account for multiple springs in a particular mechanism.

As shown in FIG. 4, the first and second coil contact surfaces 122 and 126 extend from outer face 128 of the cam portion 104 of the bushing 100 to inner face 130 of the cam portion 104 of the bushing 100. A collar 106 then extends upward from the inner face 130 of the cam portion 104 and defines an upper outer face 129. It can be appreciated that the collar 106 essentially supports the two parts of the cam portion 104. Moreover, the collar 106 supports the bushing 100 on the center portion 28 of the double-coil spring 21 when the center portion extends through the slot 112. The collar, in effect, closes one end of the slot. The bushing 100 is preferably molded as a single piece, with an integral collar and cam portion.

Figure 5:
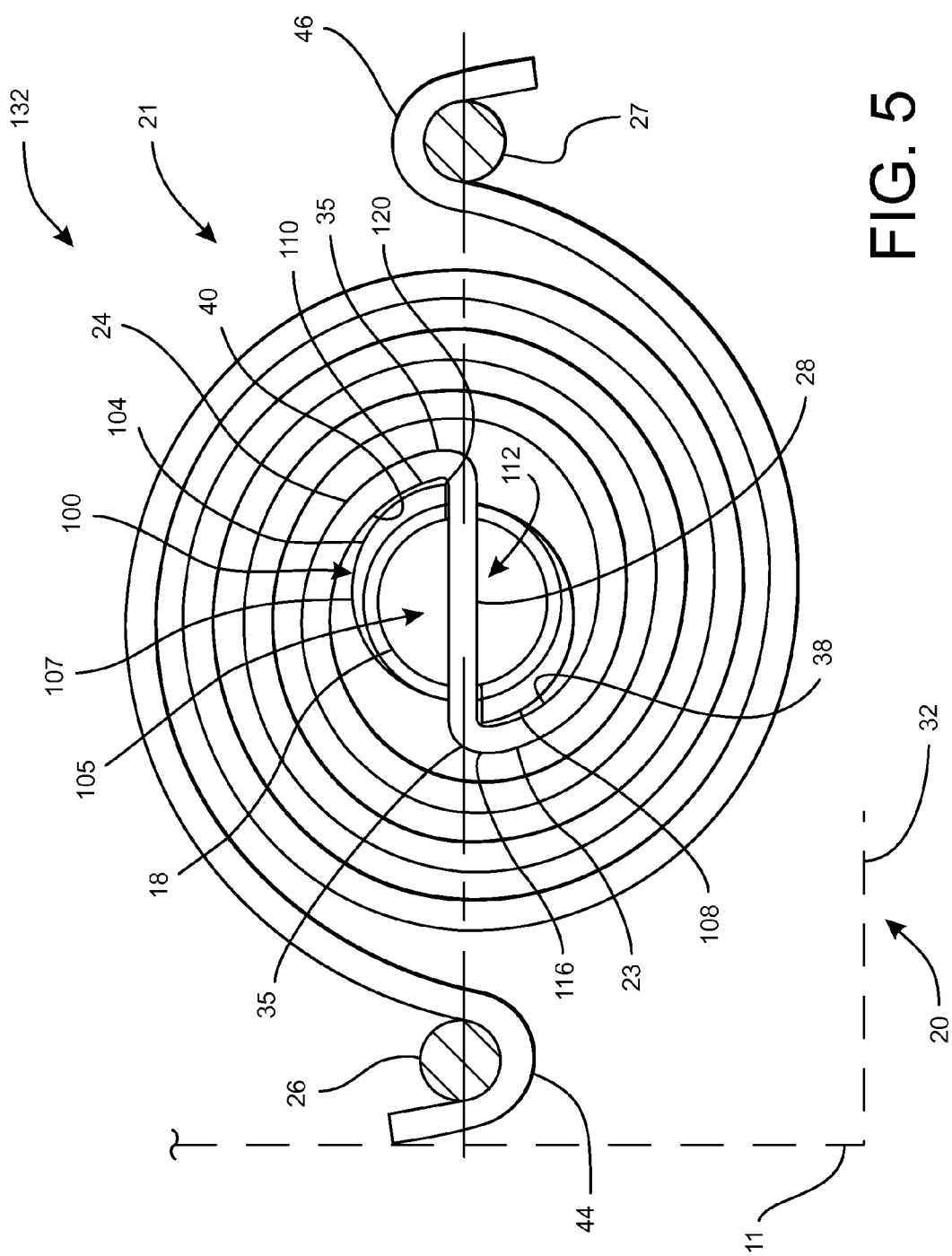
FIG. 5 is an elevational view of a double coil spring and the bushing of FIG. 4 shown in their assembled configuration.

Referring now to FIG. 5, the double coil spring 21 is shown supported on the pivot shaft 18 mounted to housing 32 of the mechanism 20 with the first and second coil portions 23 and 24 engaged at their respective ends 44 and 46 to a corresponding reaction post 26 and 27 of the mechanism. The bushing 100 is placed on the pivot shaft 18 before the double coil spring 21 with the collar 106 of the bushing 100 placed toward the center of the truck body 11. The pivot shaft 18 is slotted and the slot 112 of the bushing 100 is aligned with the slot of the pivot shaft 18 to allow the center anchor portion 28 of the double coil spring 21 to be placed into both slots. The spring 21 and the bushing 100 are shown assembled together to form coil spring assembly 132. The center anchor section 28 of the spring 21 is fitted into slot 112 of bushing 100.

Figure 6:
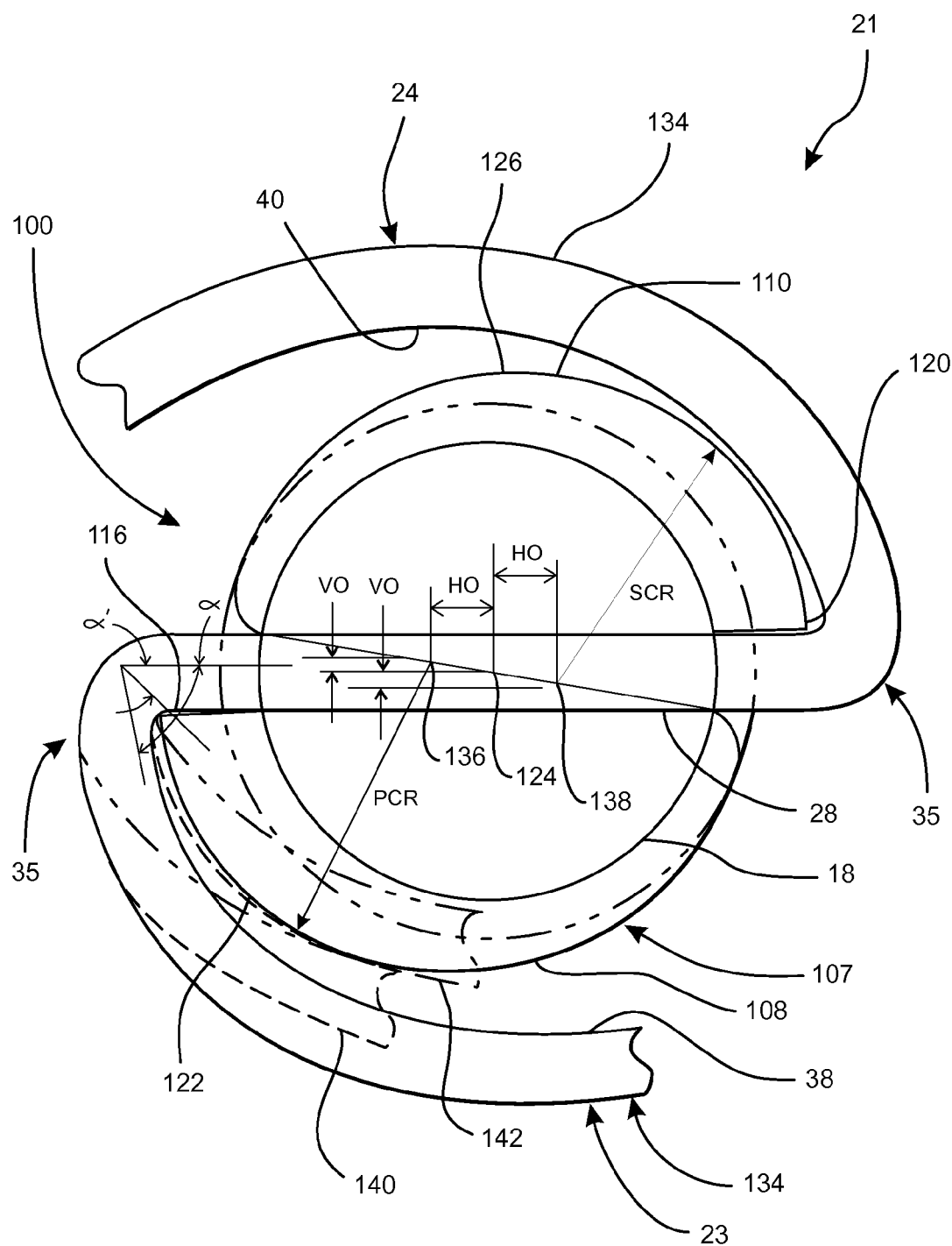
FIG. 6 is an enlarged detail view of the spring and bushing of FIG. 5 particularly illustrating the transition points of the double coil spring.

As shown in more detail in FIG. 6, the first cam surface 108 is positioned adjacent and cooperates with the first coil portion 23 of the spring 21 while the second cam surface 110 cooperates with the second coil portion 24 of the spring 21. The large ends 116, 120 of the first and second cam surfaces 108, 110, respectively, closely conforms to corresponding inner periphery 38 of the first coil portion 23 and inner periphery 40 of the second coil portion 24 of the spring 21. The large ends are particularly oriented at the coil transition portion 35 where the greatest support is needed, thereby reducing the stress at the transition portions 35 of the spring 21.

The pivot shaft 18 of the mechanism 20 extends through the central bore 105 of the bushing while the center section 28 of the spring fits within the slot 112 of the bushing 100. The eccentric external periphery 107 of the cam portion 104 of the bushing 100 is increasingly spaced from the coil portions 23, 24 of the spring 21 when the spring 21 is in its initial state within the actuation mechanism. The eccentric external periphery 107 cooperates with the spring 21 to limit the amount of deflection the coil portions may experience under load to improve the fatigue life of the spring 21, while having minimal effect upon the torsional capacity of the spring 21. In other words, it can be appreciated that as the spring winds, the coil portions 23, 24 will contact an increasing amount of a respective cam surface 108, 110. The eccentric nature of the periphery allows the spring to operate at its highest torque position in which the coil portions are tightly wound around the center section 28 of the spring.

The first coil portion 23 and the second coil portion 24 of the spring 21 are shown in FIG. 6 in solid lines in an initial position 134 of the spring in which the spring is unloaded or only slightly torqued. In the initial position 134, the inner periphery 38 of the first coil portion 23 is in intimate contact with the first coil contact surface 122 of the first cam surface 108 only at the large end 116 of the first cam surface 108. Similarly, the inner periphery 40 of the second coil portion 24 is in intimate contact with the second coil contact surface 126 of the second cam surface 110 only at the large end 120 of the second cam surface 110.

A controlled deflected position of the spring is shown as a dashed line 140 in FIG. 6. It should be appreciated that, in the controlled deflected position 140 the inner peripheries 38 and 40 of the coil portions 23 and 24, respectively, of the spring 21 are in intimate contact with the coil contact surfaces 122 and 126 of the cams 108 and 110, respectively, of the bushing 100. Such intimate contact defines an angular relationships of a between the center anchor section 28 and each of the coil portions 23 and 24 of spring 21.

The spring 21 is shown in an uncontrolled deflected position as a phantom line 142, representing the deflection of the spring 21 with the bushing 100 removed. In this position, the inner peripheries 38 and 40 of the coil portions 23 and 24, may contact pivot shaft 18. The transition portions 35 of the spring 21 are deflected such that the angles between the center anchor section 28 of the spring 21 and each of the coil portions 23 and 24 of the spring 21 are defined by angle $\alpha'$, which is significantly less than the angle $\alpha$ in the controlled deflected position 140 with the bushing 100 in place. Providing the bushing 100 such that the larger angles $\alpha$ within the transition portions 35 of the spring 21 may be maintained, the stress on the spring 21 is reduced and the resulting fatigue life of the spring 21 is lengthened.

The increasing radial dimension of the cam surfaces may be accomplished by configuring the first coil contact surface 122 and the second coil contact surface 126 such that the center of the contact surfaces 122 and 126 are defined by a dimension offset from the axis 124 through the central opening 105 of the bushing 100. For example, and as shown in FIG. 6, the first coil contact surface 122 of the first cam surface 108 may be defined by radius FCR measured from a point 136 extending a horizontal distance HO, measured along the length of the slot 112, and a vertical distance VO from the axis 124 of the bushing 100. Similarly, the second coil contact surface 126 of the second cam surface 110 may be defined by radius SCR extending from a point 138 spaced a horizontal distance HO and a vertical distance VO from axis 124 of the bushing 100 (it is understood that FIG. 6 is not drawn to scale). It should be appreciated that the contact surfaces 122 and 126 of the cams 108 and 110, respectively, may be defined with other geometry provided that the contact surfaces 122 and 126 at the large ends 116 and 120, respectively, of the bushing 100 closely conform to the inner peripheries 38 and 40, respectively, of the spring 21. For instance, rather than being defined at a constant radius offset from the axis 124 of the bushing, each camming surface may be defined at a radius measured from the axis 124 that gradually increases from the smaller end 118 to the larger end 120.

Figure 7:
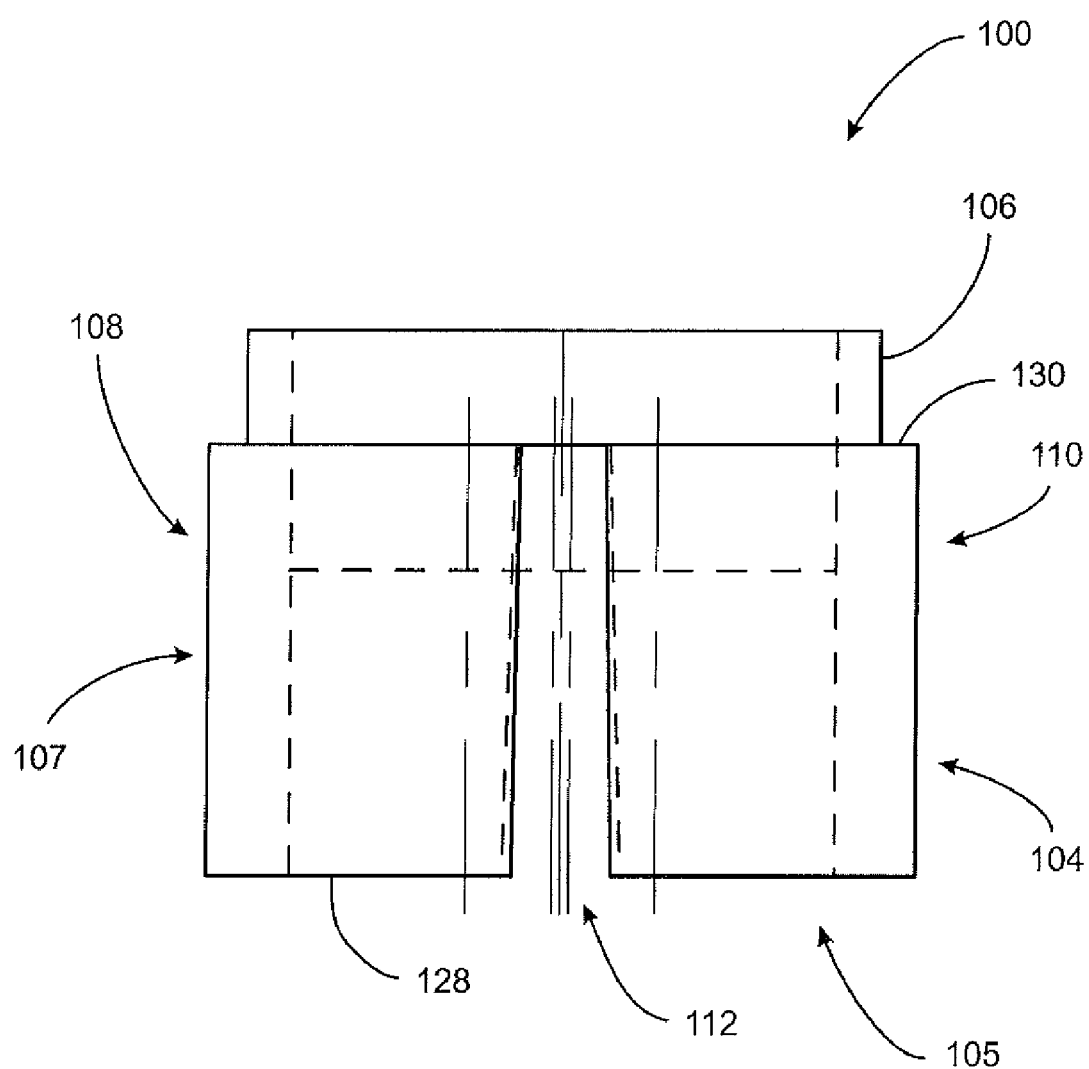
FIG. 7 is a side view of the bushing shown in FIG. 4.

As depicted in FIG. 7, the slot 112 of the bushing 100 may be tapered outwardly from inner face 130 to the outer face 128 of the cam portion 104. This taper facilitates introduction of the bushing over the spring and mounting post.

Figure 2:
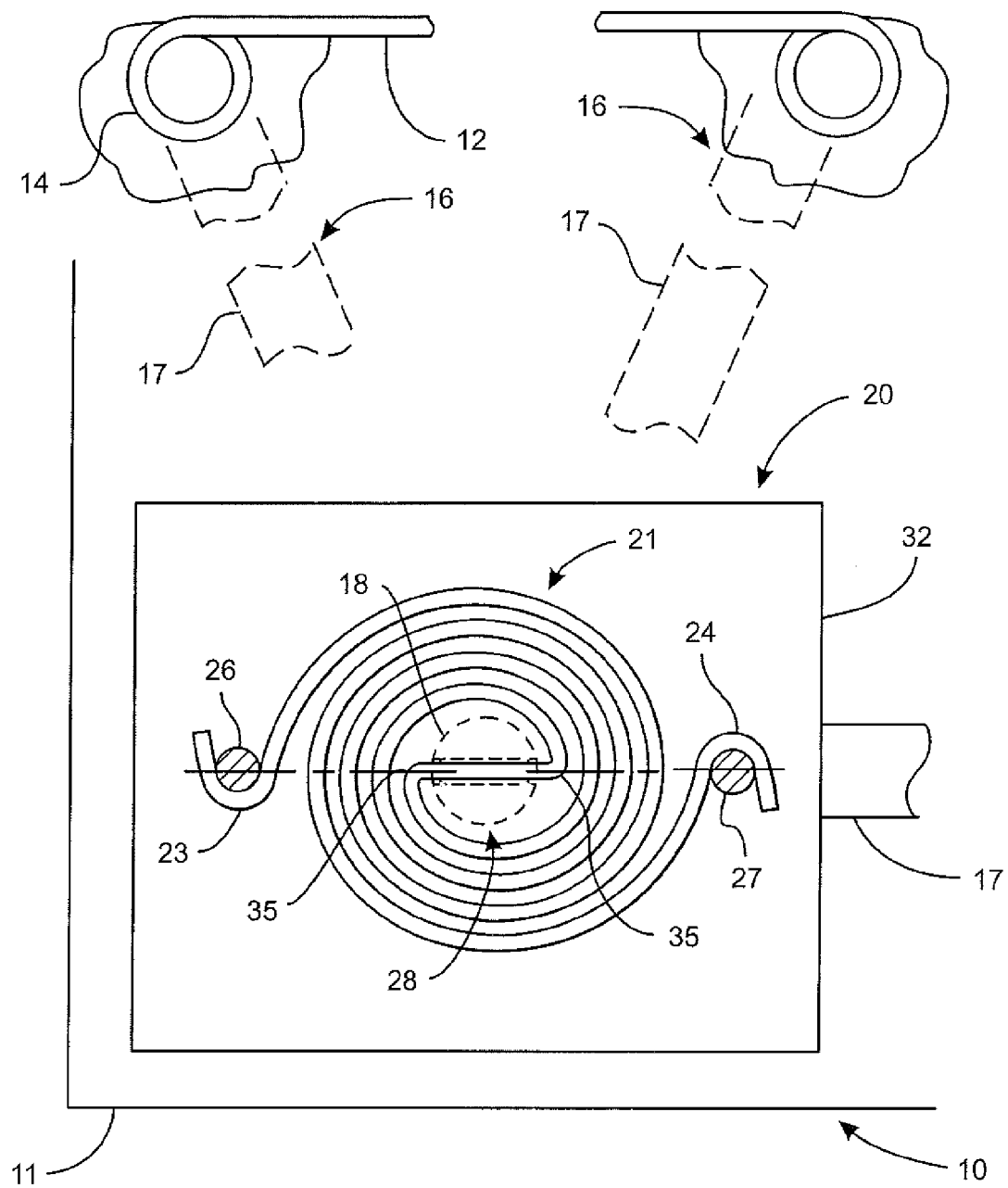
FIG. 2 is a side perspective view of an actuation mechanism of the prior art.
Figure 3:
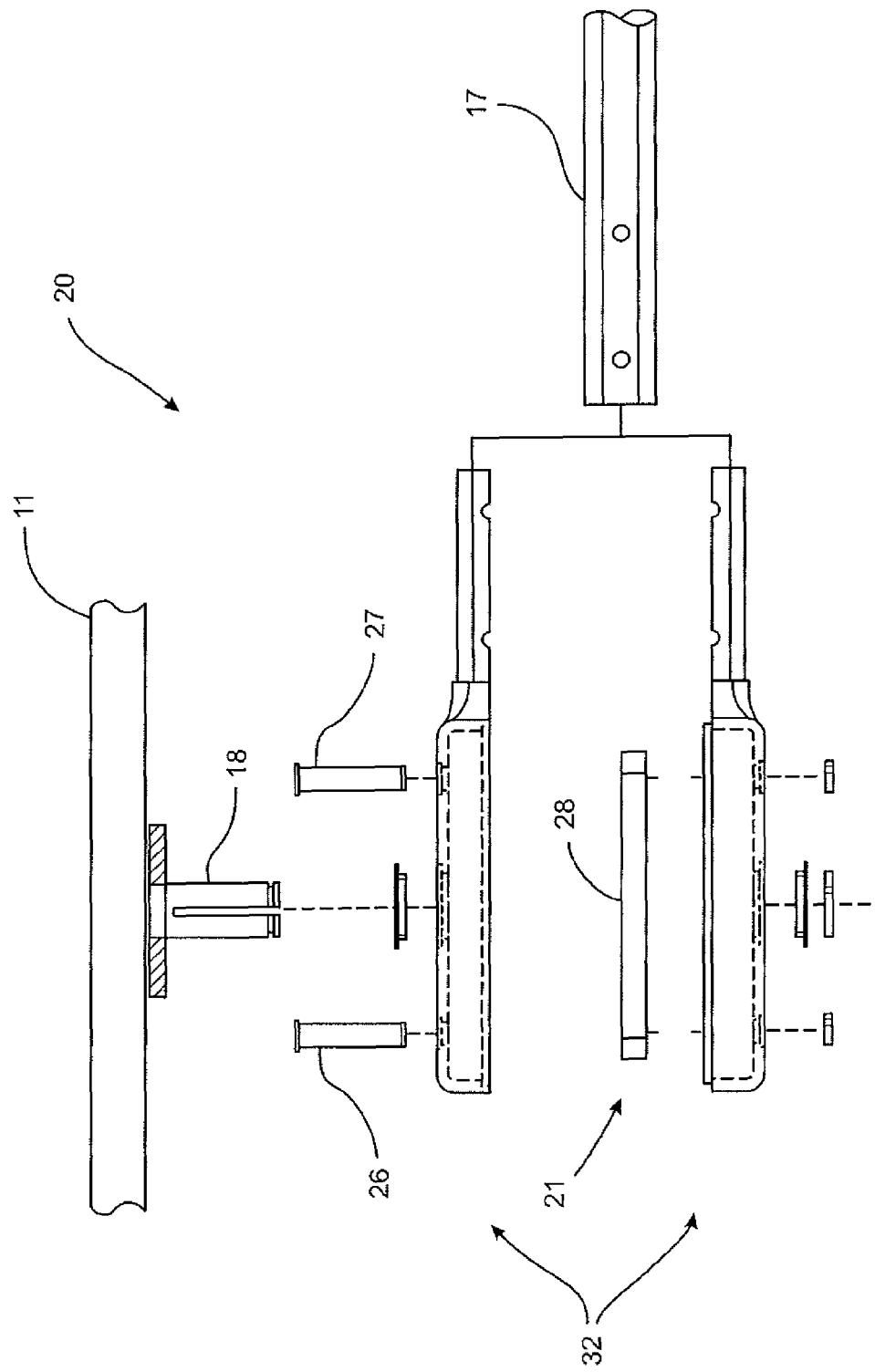
FIG. 3 is a top exploded view of the actuation mechanism depicted in FIG. 2.

It should be appreciated that the bushing 100 of the present disclosure may include complimentary right and left versions of the bushing for use in complimentary right and left actuation mechanisms. For example, the actuation mechanism 20 as shown in FIG. 2, represents a left actuation member suitable for the left side of a vehicle. It should be appreciated that the mirror image or symmetrical construction of an actuation member would be appropriate on the right side of the vehicle. Further, multiple springs may be used in the actuation system to obtain greater spring force to actuate larger, heavier mechanisms. Each spring may have its own bushing or a single bushing may be made longer to accommodate a stack of double coil springs within a single actuation mechanism. In some cases it may be desirable to orient successive springs in a stack at different angular orientations or pre-loaded. In such cases, the configuration of the cam surfaces may be modified accordingly.

The bushing 100 may be made of metal or a polymer. Preferably, the bushing 100 may be molded of a suitable polymer such as a polyoxymethylene (POM) such as DELRIN® sold by DuPont.

While the actuation system bushing described herein is susceptible to various modifications and alternative forms, specific embodiments thereof have been shown by way of example in the drawings and will herein be described in detail. It should be understood, however, that there is no intent to limit the actuation system bushing to the particular forms disclosed. On the contrary, the intention is to cover all modifications, equivalents, and alternatives falling within the spirit and scope of the invention as defined by the appended claims.

What is claimed is:

1. An actuation mechanism for a cover system on an open-topped container, the cover system including a cover extendable from a stowed position to a deployed position covering the container and a bail member attached to the cover and movable relative to the container to move the cover between the two positions, said mechanism comprising:
    at least one double-coil spring having two coil portions concentrically wound around each other with an integral center portion between each coil portion, each of said coil portions including a free reaction end;
    a pivot shaft mountable on the container, and having a portion attached to said center portion of said spring;
    a housing connectable to the bail member and defining a bore receiving said pivot shaft therethrough, said housing configured to receive said at least one spring therein with said center portion attached to said pivot shaft;
    a pair of reaction posts disposed within said housing and in contact with said reaction end of a corresponding one of said two coil portions, wherein said spring is wound about said pivot shaft when the cover is in one of the deployed and stowed positions, and is unwound relative to said pivot shaft when the cover is in the other of the deployed and stowed positions; and
    a bushing defining a central opening sized to receive said pivot shaft therethrough, a slot intersecting said central opening to receive said center portion of said spring therethrough, and a pair of opposite camming surfaces, each having one end in contact with a corresponding one of said coil portions when said spring is wound or unwound, and each having an opposite end configured to contact said corresponding one of said coil portions only when said spring is wound.

2. The actuation mechanism of claim 1, wherein:
    said at least one double-coil spring includes a transition portion between said center portion and each of said coil portions; and
    said one end of each of said camming surfaces is configured to contact said coil portions at said transition portion.

3. The actuation mechanism of claim 1, wherein:
    said central opening defines an axis; and
    each of said camming surfaces is defined at a radius measured from a point offset from said axis.

4. The actuation mechanism of claim 1, wherein:
    said central opening defines an axis; and each of said camming surfaces is defined at a radius measured from said axis that decreases from said one end to said opposite end thereof.

5. The actuation mechanism of claim 1, wherein said bushing further includes a collar concentric with and defining a portion of said central opening and attached to each of said camming surfaces.

6. A spring assembly for use in an actuation mechanism for a cover system on an open-topped container, comprising:
   a double-coil spring having two coil portions concentrically wound around each other and with an integral center portion between each coil portion, said spring having an unwound position and a wound position in which said two coil portions are wound relative to said center portion; and
   a bushing defining a slot sized to receive said center portion of said spring therethrough, and a pair of opposite camming surfaces, each having one end in contact with a corresponding one of said coil portions when said spring is in said wound or unwound position, and each having an opposite end configured to contact said corresponding one of said coil portions only when said spring is in said wound position.

7. The spring assembly of claim 6, wherein:
   said at least one double-coil spring includes a transition portion between said center portion and each of said coil portions; and
   said one end of each of said camming surfaces is configured to contact said coil portions at said transition portion.

8. The spring assembly of claim 6, wherein:
   said bushing is cylindrical and defines an axis; and
   each of said camming surfaces is defined at a radius measured from a point transverse to and offset from said axis.

9. The spring assembly of claim 6, wherein:
   said bushing is cylindrical and defines an axis; and
   each of said camming surfaces is defined at a radius measured from said axis that decreases from said one end to said opposite end thereof.

10. The spring assembly of claim 6, wherein said bushing defines a central opening, said slot intersecting said central opening.

11. The spring assembly of claim 10, wherein said bushing further includes a collar concentric with and defining a portion of said central opening and attached to each of said camming surfaces.

12. The spring assembly of claim 6, wherein said bushing is formed of a plastic.

\* \* \* \* \*